United States Patent [19]

Katayama et al.

[11] Patent Number: 5,349,263
[45] Date of Patent: Sep. 20, 1994

[54] POINTING DEVICE SUITABLE FOR MINIATURIZATION

[75] Inventors: Sumio Katayama; Junichi Iwasaki; Shuichi Toi; Ichiro Usui; Takashi Yanase, all of Chofu, Japan

[73] Assignee: Mitsumi Electric Co., Ltd., Tokyo, Japan

[21] Appl. No.: 957,249

[22] Filed: Oct. 6, 1992

[30] Foreign Application Priority Data

| Oct. 9, 1991 [JP] | Japan | 3-090681[U] |
| Dec. 27, 1991 [JP] | Japan | 3-107722[U] |
| Dec. 27, 1991 [JP] | Japan | 3-107930[U] |
| Sep. 22, 1992 [JP] | Japan | 4-065917[U] |
| Sep. 22, 1992 [JP] | Japan | 4-065918[U] |
| Sep. 22, 1992 [JP] | Japan | 4-065919[U] |

[51] Int. Cl.$^5$ ............ G06K 11/18; H01L 41/08
[52] U.S. Cl. .................. 310/338; 310/339; 341/34
[58] Field of Search .......... 310/338, 339; 340/709; 341/34

[56] References Cited

U.S. PATENT DOCUMENTS

| 3,617,660 | 11/1971 | Krakinowski | 341/34 |
| 4,103,252 | 7/1978 | Bobick | 340/709 |
| 4,313,113 | 1/1982 | Thornburg | 340/709 |
| 4,516,112 | 5/1985 | Chen | 340/709 |
| 4,550,316 | 10/1985 | Whetstone et al. | 340/709 |
| 4,673,839 | 6/1987 | Veenendaal | 310/338 |
| 4,709,342 | 11/1987 | Hosoda et al. | 310/338 |
| 4,786,768 | 11/1988 | Langewis et al. | 340/709 |
| 4,786,895 | 11/1988 | Castaneda | 340/709 |
| 5,034,574 | 7/1991 | Martovitz | 340/709 |

FOREIGN PATENT DOCUMENTS

| 0121866 | 10/1984 | European Pat. Off. | 340/709 |
| 0422589 | 4/1991 | European Pat. Off. | 340/709 |
| 0030221 | 1/1990 | Japan | 341/34 |
| 9013800 | 11/1990 | World Int. Prop. O. | 310/338 |

OTHER PUBLICATIONS

IBM Technical Disclosure Bulletin vol. 28 No. 5 Oct., 1985, "Smart Key" pp. 1859–1860.

Primary Examiner—Thomas M. Dougherty
Attorney, Agent, or Firm—Frishauf, Holtz, Goodman & Woodward

[57] ABSTRACT

A pointing device for use in moving a cursor displayed on a display, includes a pressure sensing sheet including first through fourth pressure detection elements and a base member mounted on the pressure sensing sheet. The base member is provided with first through fourth protrusions formed on its under surface opposite to the pressure sensing sheet in facing relation to the first through fourth pressure detection elements, respectively. The base member is provided with an operation shaft formed on an upper surface of the base member which projects upwardly therefrom. The device further comprises a cap member coupled to the operation shaft of the base member.

18 Claims, 9 Drawing Sheets

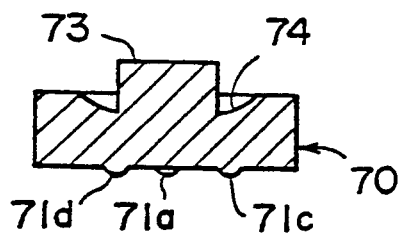
F I G. 5
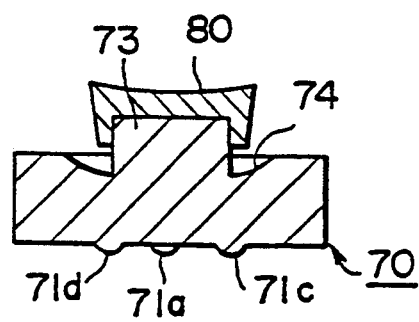
F I G. 6

FIG. II

POINTING DEVICE SUITABLE FOR MINIATURIZATION

BACKGROUND OF THE INVENTION

This invention relates to a pointing device for use in moving a cursor displayed on a display.

The pointing devices of the type described have been used in an information processing apparatus for processing video information or a video game machine. Generally, the pointing devices are classified into three groups, namely, those having four push buttons for moving a cursor in rightward, leftward, upward, and downward directions, respectively, those having a four-segment switch which is an integration of the above-mentioned four push buttons, and those having a joy stick.

To meet the recent demand for a small-sized information processing apparatus, a pointing device for use therein must be small. However, the conventional pointing devices are relatively large because they have a large number of components and a complicated arrangement.

SUMMARY OF THE INVENTION

It is therefore an object of this invention to provide a pointing device which has a simple structure and which can be reduced in size.

It is another object of this invention to provide a pointing device which is capable of controlling rapid and fine-pitch movement of a cursor.

Other objects of this invention will become clear as the description proceeds.

According to this invention, a pointing device for use in moving a cursor displayed on a display comprises a pressure sensing sheet including first through fourth pressure detection elements, and a base member mounted on the pressure sensing sheet and provided with first through fourth protrusions formed on its under surface opposite to the pressure sensing sheet in facing relation to the first through the fourth pressure detection elements, respectively.

BRIEF DESCRIPTION OF THE DRAWING

FIG. 5 is a sectional view of a modified example of the base member;

FIG. 6 is a sectional view of another modified example of the base member;

DESCRIPTION OF THE PREFERRED EMBODIMENTS

Figure 1:
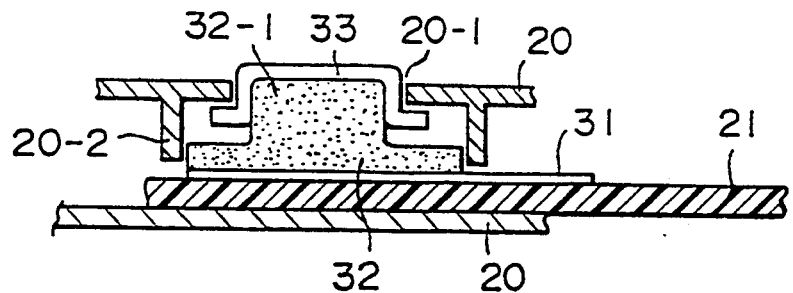
FIG. 1 is a sectional view of an operating portion of a conventional pointing device.

For a better understanding of this invention, description will at first be made as regards the conventional pointing device with reference to FIG. 1. A case 20 contains a printed circuit board 21. An operating portion is mounted on the printed circuit board 21 and comprises a pressure sensing sheet 31, a base member 32, and a cap member 33. The pressure sensing sheet 31 consists of a piezoelectric element and is adhered to the printed circuit board 21 by the use of an adhesive or a double-sided adhesive tape. The base member 32 is made of rubber and mounted on the pressure sensing sheet 31. An operation shaft 32-1 is formed on an upper surface of the base member 32 to be upwardly projected therefrom. The cap member 33 is made of resin and coupled to the operation shaft 32-1. An upper portion of the cap member 33 is outwardly projected from the case 20 through an opening 20-1 formed in the case 20. The case 20 is provided with a rib 20-2 formed on an inner wall of the case 20 around the opening 20-1 so as to avoid lateral displacement of the base member 32.

The conventional pointing device requires four operating portions of the above-described structure in order to move a cursor displayed on a display in rightward, leftward, upward, and downward directions. The four operating portions are mounted on the printed circuit board 21. Specifically, the four operating portions are arranged at righthand, lefthand, upside, and downside portions within an area defined on the printed circuit board 21.

Figure 2:
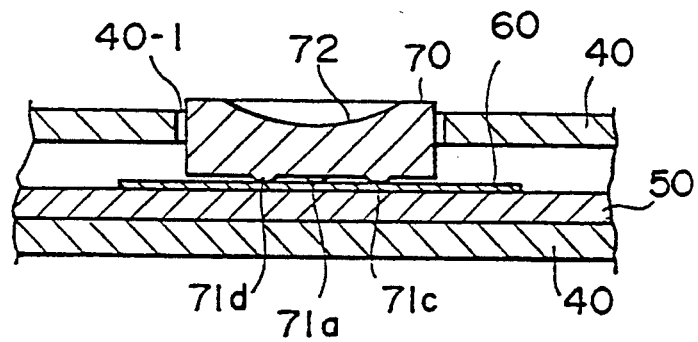
FIG. 2 is a sectional view of an operating portion of a pointing device according to an embodiment of this invention.
Figure 3:
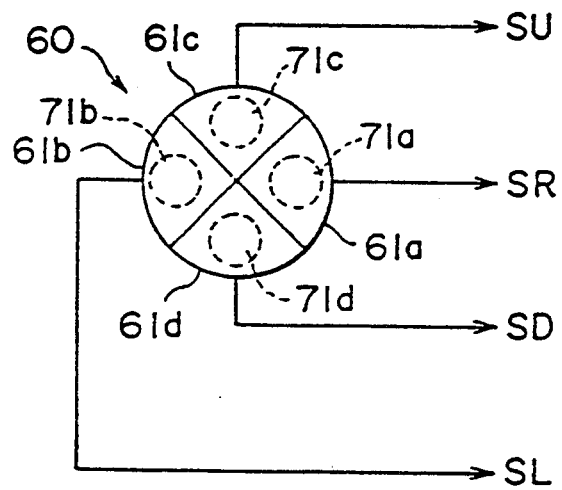
FIG. 3 is a view for describing a pressure sensing sheet shown in FIG. 2.
Figure 4A:
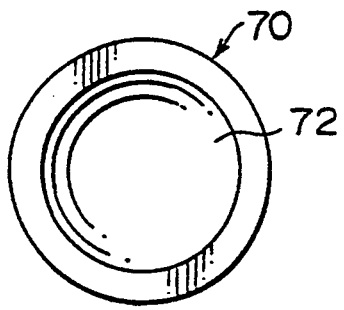
FIG. 4(a) is a top plan view of the base member.
Figure 4B:
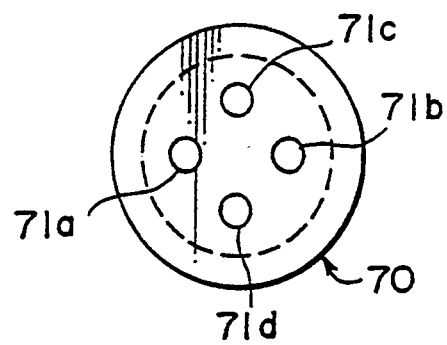
FIG. 4(b) is a bottom plan view of the base member.
Figure 4C:
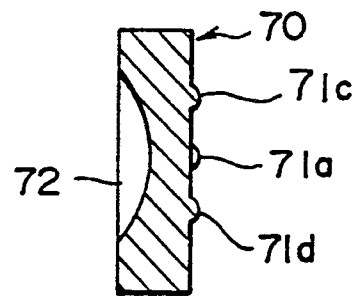
FIG. 4(c) is a cross-sectional view of the base member.

Referring to FIGS. 2 through 4, description will proceed to a basic structure of an operating portion of a pointing device according to an embodiment of this invention. In FIG. 2, a case 40 contains a printed circuit board 50. A pressure sensing sheet 60 is located on the printed circuit board 50. The pressure sensing sheet 60 includes four pressure detection elements consisting of a piezoelectric element, as will later be described. A base member 70 made of rubber is mounted on the pressure sensing sheet 60. An upper portion of the base member 70 is outwardly projected from the case 40 through an opening 40-1 formed in the case 40.

Referring to FIG. 3, the pressure sensing sheet has a circular shape and comprises first through fourth pressure detection elements 61a, 61b, 61c, and 61d. The first through the fourth pressure detection elements 61a through 61d are responsive to a pressure applied thereto and produce first through fourth pressure detection signals SR, SL, SU, and SD having signal levels dependent upon the magnitude of the pressure. The first through the fourth pressure detection signals SR, SL, SU, and SD are for indicating rightward, leftward, upward, and downward movement of a cursor, respectively.

Referring to FIG. 4, the base member 70 is provided with first through fourth protrusions 71a, 71b, 71c, and 71d of a semispherical shape formed on an under surface thereof with an angular space of 90°. As depicted by a dotted circle in FIG. 3, the base member 70 is mounted on the pressure sensing sheet 60 so that the first through the fourth protrusions 71a through 71d are positioned on the first through the fourth pressure detection elements 61a through 61d of the pressure sensing sheet 60, respectively. A recess 72 having an arcuate section is formed on an upper surface of the base member 70. An operator brings his fingertip into contact with the recess 72 to apply a pressure. The recess 72 has a surface area greater than that of the fingertip. By shifting a contact position between the fingertip and the recess 72 formed on the upper surface of the base member 70, the base member 70 is swingingly moved so as to sensitively control the pressure applied on the first through the fourth protrusions 71a through 71d. Thus, a cursor displayed on a display is moved in a desired one of rightward, leftward, upward, and downward directions. The pressure applied on the base member 70 is rapidly and reliably transmitted to the first through the fourth pressure detection elements 61a through 61d via the first through the fourth protrusions 71a through 71d, respectively.

Referring to FIG. 5, a modified example of the base member 70 will be described. The base member 70 has an operation shaft 73 formed on the upper surface of the base member 70 to be upwardly projected therefrom. A recess 74 of an annular shape is formed around the operation shaft 73. The operation shaft 73 is for facilitating the swinging movement of the base member 70. In this structure, the pressure applied on the base member 70 is more rapidly and more reliably transmitted to the first through the fourth pressure detection elements 61a through 61d, as compared with the embodiment illustrated in FIG. 4. The recess 74 has a decremental depth gradually decreasing in an outward direction. Other portions of the base member 70 are similar to those illustrated in FIG. 4. As shown in FIG. 6, a cap member 80 may be coupled to an upper portion of the operation shaft 73.

Figure 7:
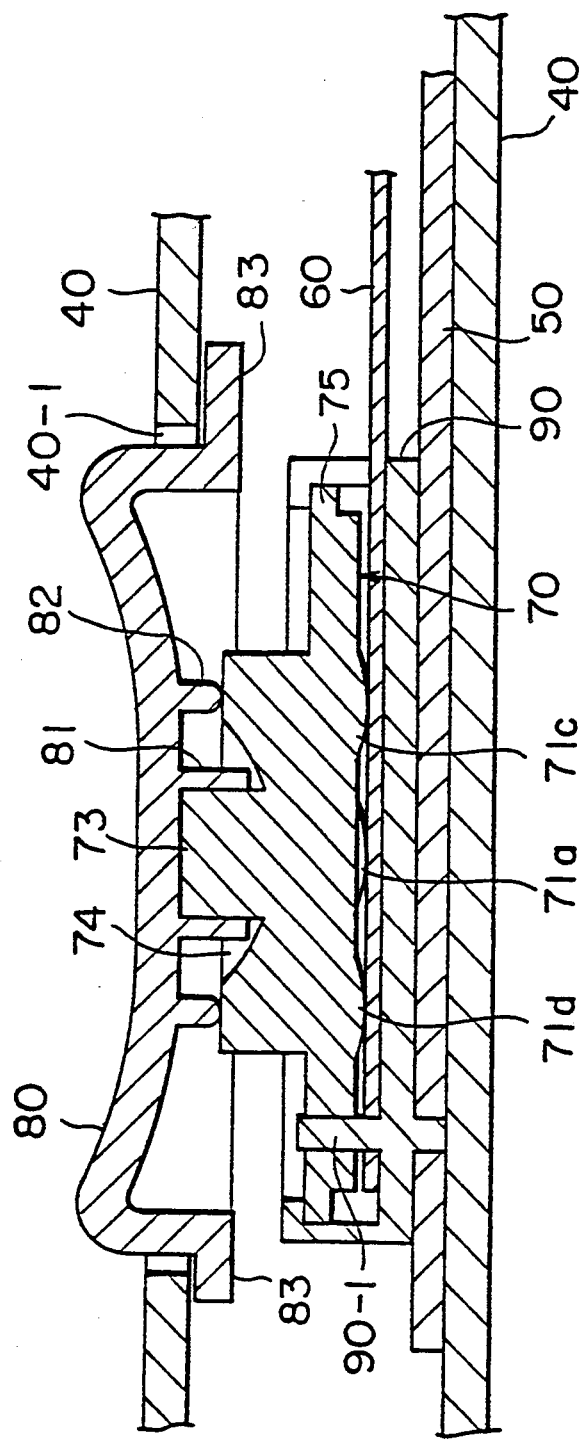
FIG. 7 is a sectional view of an operating portion of a pointing device according to another embodiment of this invention.

Referring to FIG. 7, description will proceed to a pointing device according to another embodiment of this invention. The case 40 contains the printed circuit board 50 on which a pedestal member 90 of a substantially circular shape is mounted. The pedestal member 90 is made of resin and comprises a positioning pin 90-1 which projects upwardly and downwardly from the pedestal member 90 on upper and under sides thereof to form an upward projecting part and a downward projecting part, respectively. The pedestal member 90 is located on the printed circuit board 50 by the use of the downward projecting part of the positioning pin 90-1. A pressure sensing sheet 60 similar to that described in conjunction with FIG. 3 is located on the pedestal member 90 by the use of the upward projecting part of the positioning pin 90-1. As will later be described, the pressure sensing sheet 60 has a lead-through portion for electrical connection between the first through the fourth pressure detection elements 61a through 61d and an electric circuit mounted on the printed circuit board 50. The lead-through portion outwardly extends from the pedestal member 90. A base member 70 is mounted on the pressure sensing sheet 60. The base member 70 is similar to that illustrated in FIG. 5 except that the base member 70 is provided with a flange 75 formed on the side surface thereof. A cap member 80 made of resin is coupled to the base member 70 through an operation shaft 73. Specifically, the cap member 80 is provided, at a center portion of its under surface, with a first rib 81 of an annular shape for receiving the operation shaft 73. A second rib 82 of an annular shape is formed around the first rib 81. The first rib 81 has a length shorter than that of the operation shaft 73 so as not to reach the bottom of a recess 74. The second rib 82 has a length such that a lower end of the second rib 82 is brought into contact with an upper surface of the base member 70. The cap member 80 has a main surface formed so that an inner portion is lower than an outer portion for convenience of pressing operation by a finger of an operator. In addition, the cap member 80 has a flange 83 formed on an outer periphery of the cap member 80.

With this structure, when the outer periphery of the cap member 80 is pressed, a large pressure is applied through first through fourth protrusions 71a through 71d of the base member 70 to first through fourth pressure detection elements 61a through 61d of the pressure sensing sheet 60, respectively. In this event, a cursor is rapidly moved. Such operation is adaptable to macrocontrol of the cursor. On the other hand, when a small pressure is applied onto the inner portion of the cap member 80, the small pressure is transmitted through the first through the fourth protrusions 71a through 71d of the base member 70 to the first through the fourth pressure detection elements 61a through 61d of the pressure sensing sheet 60, respectively. In this event, the cursor is moved at a fine pitch. This operation is adaptable to microcontrol of the cursor.

Figure 8:
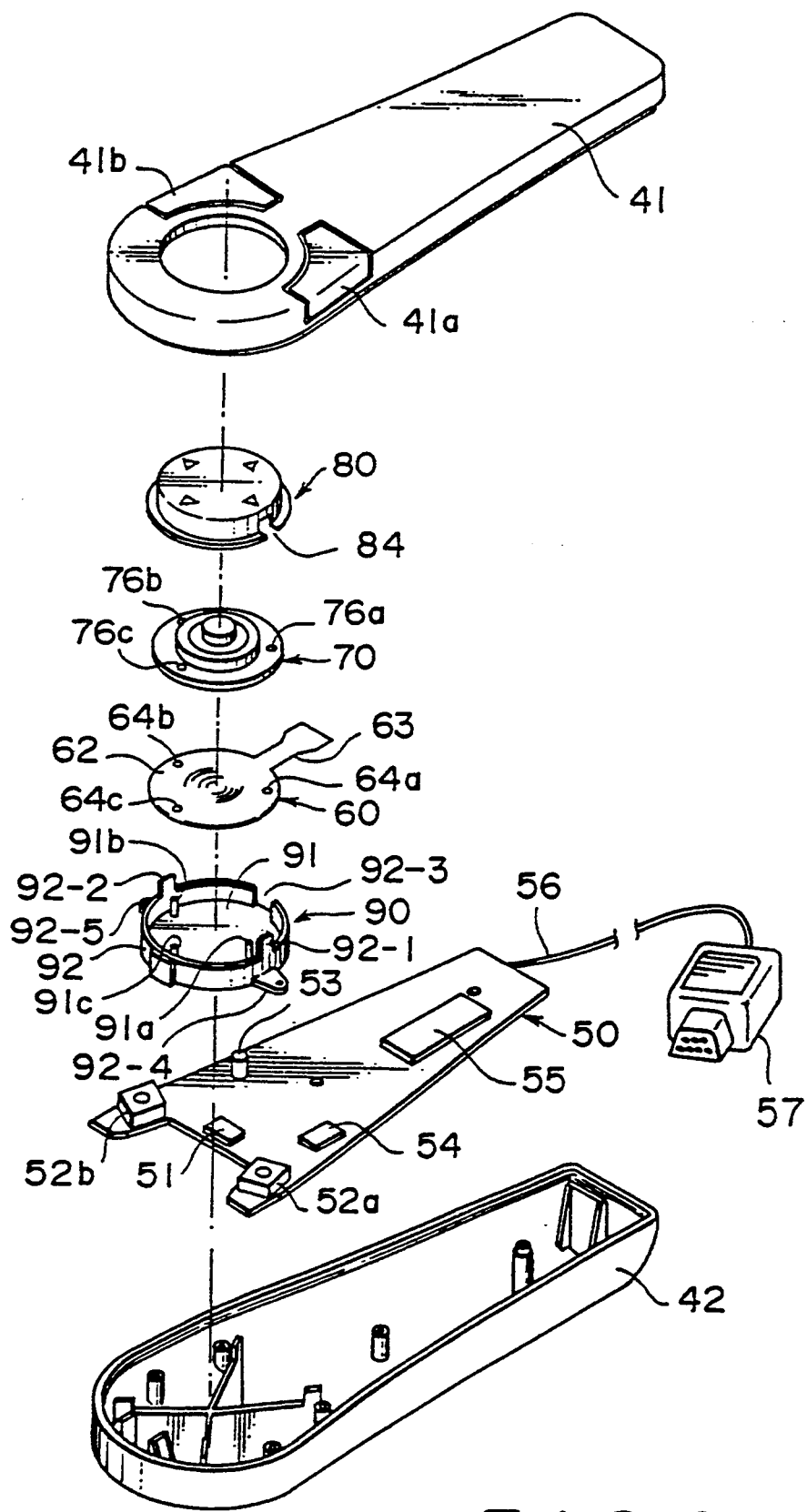
FIG. 8 is an exploded perspective view of a pointing device according to this invention.
Figure 9:
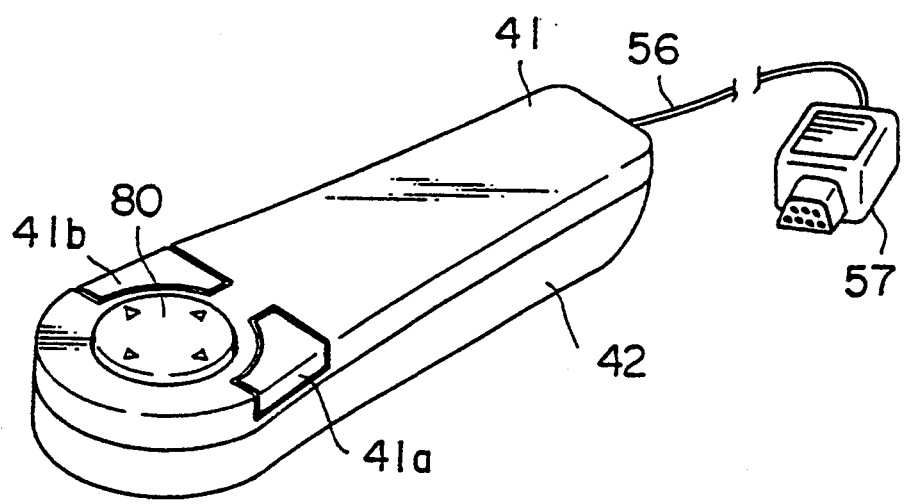
FIG. 9 is a view showing an external appearance of the pointing device illustrated in FIG. 8.

Referring to FIGS. 8 and 9, a whole structure of the pointing device will be described. The case 40 comprises an upper case 41 and a lower case 42. The printed circuit board 50 is attached to the lower case 42 by the use of screws. As described in conjunction with FIG. 7, the operating portion comprises the pedestal member 90 of a circular shape, the pressure sensing sheet 60, the base member 70 made of rubber, and the cap member 80 made of resin. The pedestal member 90 is attached to the lower case 42 by the use of screws.

On the printed circuit board 50 are mounted a connector 51 for connection with a printed circuit (not shown) formed on the lead-through portion of the pressure sensing sheet 60, and switches 52a and 52b which will later be described. A number of circuit components such as an electrolytic capacitor 53, IC chips 54 and 55 are also mounted on the printed circuit board 50. Those circuit components form a signal processing circuit for processing the first through the fourth signals SR, SL, SU, and SD (FIG. 3) supplied from the pressure sensing sheet 60. Although not shown in the figure, the printed circuit board 50 further comprises a printed circuit formed thereon for electrical connection of the above-mentioned components. The signal processing circuit is connected through a cord 56 to a connector 57. The connector 57 is for connection with an electronic apparatus which comprises the display and which is not shown in the figure. The signals processed by the signal processing circuit are delivered through the cord 56 and the connector 57 to the electronic apparatus.

The pedestal member 90 comprises a bottom plate 91 and a side wall 92 having projections 92-1 and 92-2 and a notch 92-3. Mounting tabs 92-4 and 92-5 are formed on an outer surface of the side wall 92 to secure the pedestal member 90 to the lower case 42 through the screws. The bottom plate 91 is provided with three pins 91a, 91b, and 91c for holding the pressure sensing sheet 60 and the base member 70.

As described in conjunction with FIG. 3, the pressure sensing sheet 60 comprises a detecting portion 62 having four pressure detection elements (not shown), and a lead-through portion 63 with a printed circuit (not shown) electrically connected to the pressure detection elements. The pressure sensing sheet 60 is provided, at positions corresponding to the pins 91a, 91b, and 91c, with through holes 64a, 64b, and 64c for inserting the pins 91a, 91b, and 91c, respectively. Likewise, the base member 70 is provided, at positions corresponding to the pins 91a, 91b, and 91c, with through holes 76a, 76b, and 76c for inserting the pins 91a, 91b, and 91c, respectively. The pressure sensing sheet 60 is mounted on the pedestal member 90 by inserting the pins 91a, 91b, and 91c in the through holes 64a, 64b, and 64c, respectively. After the pressure sensing sheet 60 is mounted, the pins 91a, 91b, and 91c are inserted in the through holes 76a, 76b, and 76c of the base member 70, respectively. Thus, the base member 70 is mounted on the pedestal member 90 to overlap the pressure sensing sheet 60. The lead-through portion 63 of the pressure sensing sheet 60 outwardly extends from the pedestal member 90 through the notch 92-3 and is connected through the cap connector 51 to the signal processing circuit on the printed circuit board 50. One protrusion 92-1 of the pedestal member 90 is fitted into a notch 84 formed in the cap member 80 while the other protrusion 92-2 is fitted into the other notch (not shown) formed in the cap member 80. With this structure, the pressure sensing sheet 60 and the base member 70 can be assembled to a predetermined position of the pedestal member 90 without causing displacement or off-center arrangement to occur.

Referring to FIG. 9, the upper case 41 is provided with push buttons 41a and 41b for turning on and off the switches 52a and 52b, respectively. When the cursor has been moved to a desired position, the operator pushes the push button 41a. In this event, the switch 52a delivers a signal to the electronic apparatus to notify that the movement of the cursor is finished and the position of the cursor is settled. The switch 52b is for cancelling the signal delivered by the switch 52a.

Figure 10:
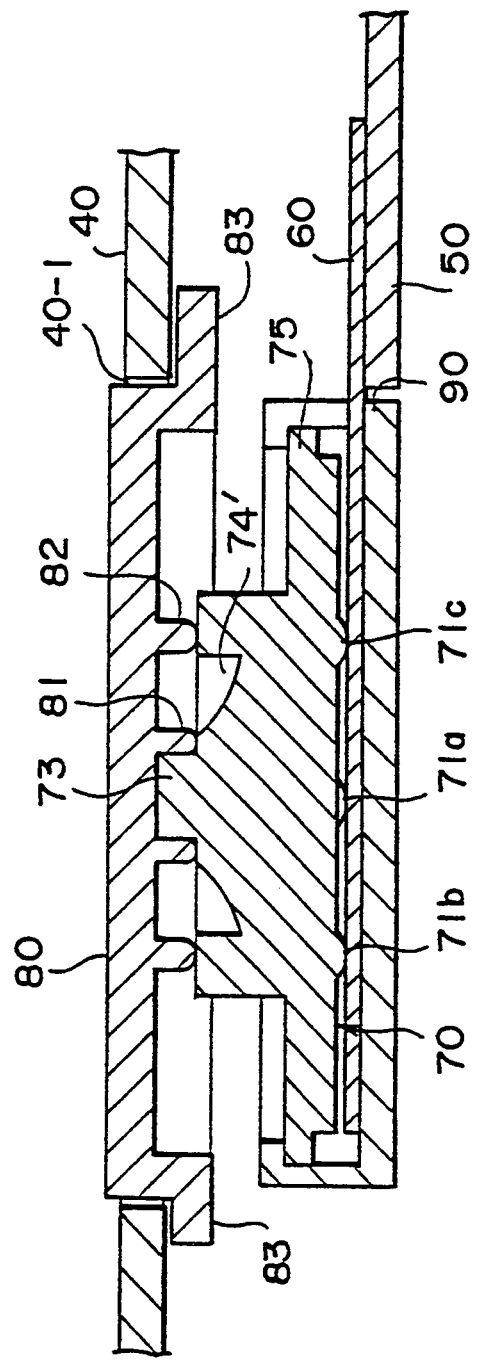
FIG. 10 is a sectional view of an operating portion of a pointing device according to a further embodiment of this invention.

Referring to FIG. 10, description will proceed to an operating portion according to a further embodiment of this invention. In FIG. 10, the similar parts are designated by like reference numerals as in FIG. 7 and description thereof will be omitted. In this embodiment, a base member 70 has an upper surface provided with an annular recess 74' having a configuration reverse to that of the recess 74 illustrated in FIG. 7. The annular recess 74' has an incremental depth gradually increasing in an outward direction. Specifically, the annular recess 74' is formed in a zone extending from an inward position adjacent to a first rib 81 to an outward position near to a region right above protrusions 71a through 71d. The recess 74' has a maximum depth at the outward position.

On the other hand, a second rib 82 of an annular shape is additionally formed on the under surface of the cap member 80 opposite to the base member 70 to surround the first rib 81. The second rib 82 is situated above the protrusions 71a through 71d of the base member 70 and brought into contact with an upper surface of the base member 70 when the cap member 80 is mounted on the base member 70.

With this structure, when a pressure is applied on a center portion of the cap member 80 by a finger of an operator, the pressure is given to the base member 70 through the first rib 81. The pressure is then transmitted along the inclination of the recess 74' to any one of the protrusions 71a through 71d to act on the corresponding pressure detection element. Such operation is adaptable to microcontrol of the cursor.

On the other hand, when the pressure is applied by the finger of the operator to a peripheral portion of the cap member 80, the pressure is given through the second rib 82 to the base member 70. The pressure is then transmitted right below to any one of the protrusions 71a through 71d to act on the corresponding pressure detection element. This operation is adaptable to macrocontrol of the cursor.

Figure 11:
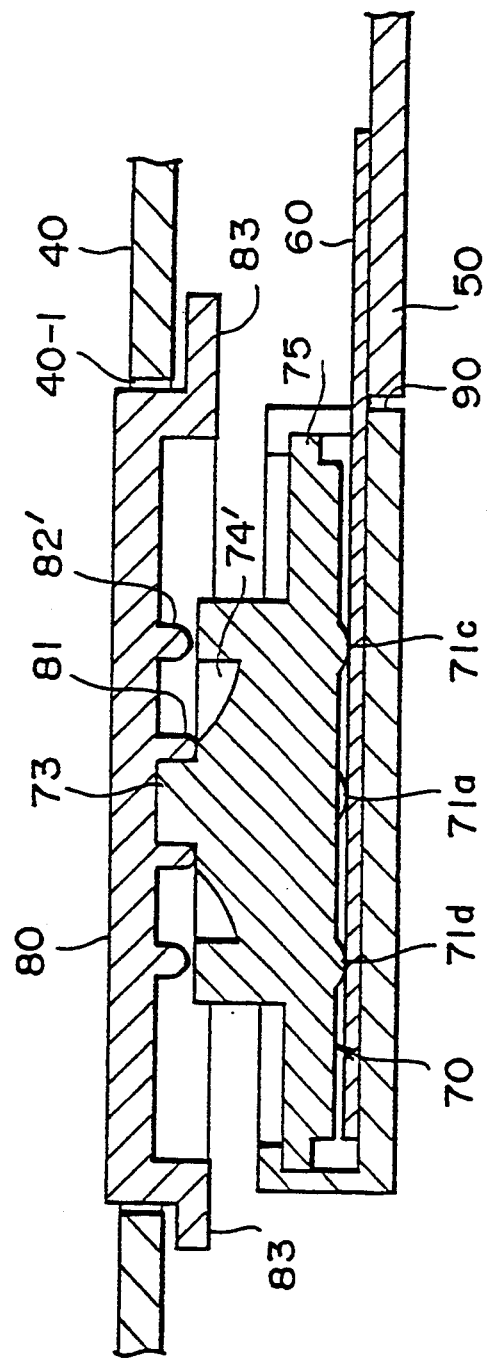
FIG. 11 is a sectional view of an operating portion of a pointing device according to a still further embodiment of this invention.

Referring to FIG. 11, an operating portion according to a still further embodiment of this invention will be described. In FIG. 11, the similar parts are designated by like reference numerals as in FIG. 10 and description thereof will be omitted. In this embodiment, a second rib 82' has a length slightly shorter than that of the second rib 82 illustrated in FIG. 10. Specifically, the length of the second rib 82' is selected so that the second rib 82' is situated above protrusions 71a through 71d of the base member 70 and slightly spaced apart from an upper surface of the base member 70 when the cap member 80 is coupled to the base member 70.

Figure 12:
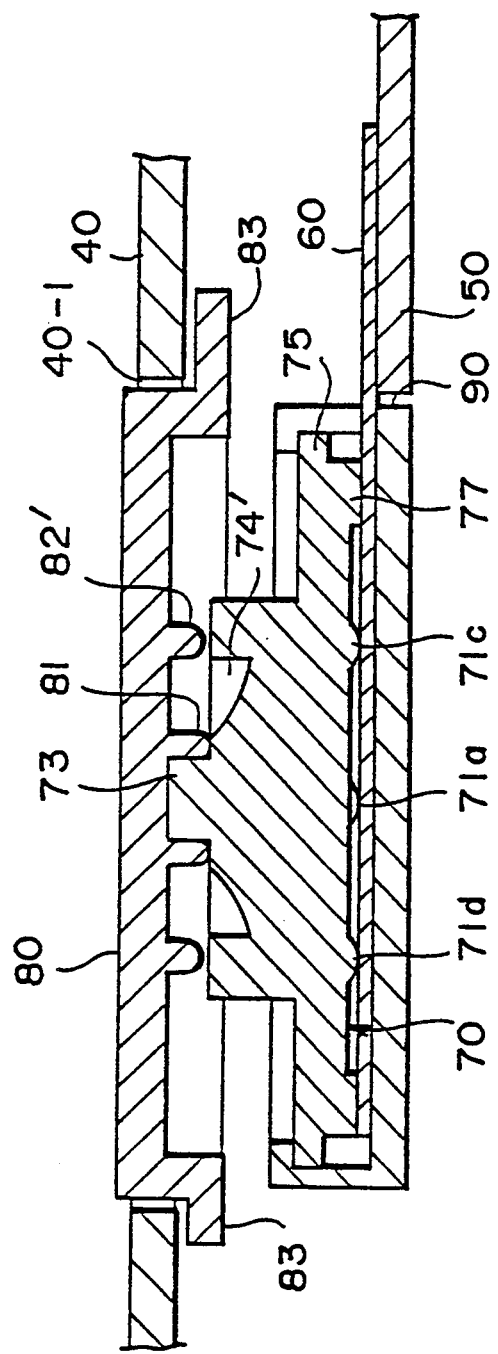
FIG. 12 is a sectional view of an operating portion of a pointing device according to a yet further embodiment of this invention.

Referring to FIG. 12, description will proceed to an operating unit according to a yet further embodiment of this invention. In FIG. 12, the similar parts are designated by like reference numerals as in FIG. 11 and description thereof will be omitted. In this embodiment, an annular projection 77 having a thickness similar to those of protrusions 71a through 71d is formed on the under surface of the base member 70 outside of the protrusions 71a through 71d, namely, at an outer peripheral edge of the under surface of the base member 70. The effect of the annular projection 77 will be described hereinunder. When a pressure is applied by a finger of an operator on an outer peripheral portion of the cap member 80, the flange 75 of the base member 70 may partially be deformed. In this event, any protrusion (71a through 71d) near the deformed part may slip on the pressure sensing sheet 60. This means that the pressure applied on the cap member 80 may not be reliably transmitted to the pressure sensing sheet 60. The annular projection 77 serves to remove such defect. Specifically, the annular projection 77 is always brought into tight contact with the pressure sensing sheet 60. Even if the flange 75 of the base member 70 is partially deformed when the cap member 80 is pressed, the protrusions 71a through 71d are prevented from slipping on the pressure sensing sheet 60.

As described above, the first and the second ribs have different protrusion lengths so as to explicitly distinguish the microcontrol and the macrocontrol of the cursor. As a result, controllability of the cursor is improved.

Figure 13:
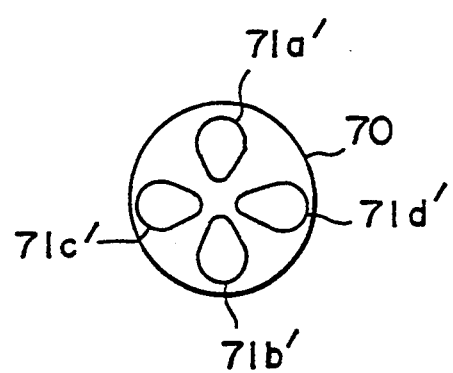
FIG. 13 is a bottom view for describing a modified example of protrusions formed on the base member shown in FIG. 2.

Referring to FIG. 13, protrusions 71a', 71b', 71c', and 71d' of the base member 70 have a substantially triangular shape tapered in an inward direction. Thus, it is possible to reliably transmit very small variation of the pressure to the pressure sensing sheet 60 when microcontrol of the cursor is performed.

While this invention has thus been described in conjunction with several embodiments thereof, it will readily be possible for those skilled in the art to put this invention into practice in various other manners.

What is claimed is:

1. A pointing device for use in moving a cursor displayed on a display, comprising:
   a pressure sensing sheet including first through fourth pressure detection elements;
   a base member mounted on said pressure sensing sheet and provided with first through fourth protrusions formed on an under surface opposite to said pressure sensing sheet and in facing relation to said first through said fourth pressure detection elements, respectively, said base member being provided with an operation shaft formed on an upper surface of said base member and which projects upwardly therefrom; and
   a cap member coupled to said operation shaft of said base member.

2. A pointing device as claimed in claim 1, wherein each of said first through said fourth protrusions has a semispherical shape.

3. A pointing device as claimed in claim 1, wherein each of said first through said fourth protrusions has a substantially triangular shape tapered in an inward direction.

4. A pointing device as claimed in claim 2, wherein said base member is provided with a recess having an arcuate section formed in an upper surface of said base member.

5. A pointing device as claimed in claim 1, further comprising:
   a pedestal member for holding said pressure sensing sheet and said base member.

6. A pointing device as claimed in claim 5, wherein:
   said pedestal member has positioning pins at an upper surface thereof, each of said pressure sensing sheet and said base member being provided with through holes for inserting said positioning pins.

7. A pointing device as claimed in claim 1, wherein said cap member is provided with a first rib formed on an under surface thereof to receive said operation shaft, said first rib having a lower end which is brought into contact with an upper surface of said base member.

8. A pointing device as claimed in claim 1, wherein an annular recess is formed in the upper surface of said base member to surround said operation shaft.

9. A pointing device as claimed in claim 8, wherein said recess extends to an outward position near to a region right above said first through said fourth protrusions and has a decremental depth gradually decreasing in an outward direction.

10. A pointing device as claimed in claim 8, wherein said recess extends to an outward position near to a region right above said first through said fourth protrusions and has an incremental depth gradually increasing in an outward direction.

11. A pointing device as claimed in claim 9, wherein a second rib of an annular shape is formed on the under surface of said cap member at a position corresponding to the region right above said first through said fourth protrusions.

12. A pointing device as claimed in claim 11, wherein said second rib has a lower end which is brought into contact with the upper surface of said base member.

13. A pointing device as claimed in claim 11, wherein said second rib has a lower end which is slightly spaced apart from the upper surface of said base member.

14. A pointing device as claimed in claim 2, wherein an annular projection having a thickness similar to those of said first through said fourth protrusions is formed on the under surface of said base member at an outer peripheral edge outside of said first through said fourth protrusions.

15. A pointing device as claimed in claim 3, wherein said base member is provided with a recess having an arcuate section formed in an upper surface of said base member.

16. A printing device as claimed in claim 3, wherein said base member is provided with an operation shaft formed on an upper surface of said base member to be upwardly projected therefrom.

17. A pointing device a claimed in claim 3, wherein an annular projection having a thickness similar to those of said first through said fourth protrusions is formed on the under surface of said base member at an outer peripheral edge outside of said first through said fourth protrusions.

18. A pointing device for use in moving a cursor displayed on a display, comprising:
   a pressure sensing sheet including first through fourth pressure detection elements;
   a base member mounted on said pressure sensing sheet and provided with first through fourth protrusions formed on an under surface thereof opposite to said pressure sensing sheet and in facing relation to said first through said fourth pressure detection elements, respectively, said base member being provided with an operation shaft formed on an upper surface of said base member and which projects upwardly therefrom, and an annular recess formed in the upper surface of said base member in surrounding relation to said operation shaft.

* * * * *